(12) United States Patent
Chu et al.

(10) Patent No.: US 10,498,670 B1
(45) Date of Patent: Dec. 3, 2019

(54) POWER RESTRICTION AND BACKOFF CONTROL FOR WIRELESS DEVICES

(71) Applicant: Marvell International Ltd., Hamilton (BM)

(72) Inventors: Liwen Chu, San Ramon, CA (US);
Jinjing Jiang, San Jose, CA (US);
Hongyuan Zhang, Fremont, CA (US);
Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/962,882

(22) Filed: Apr. 25, 2018

Related U.S. Application Data

(60) Provisional application No. 62/489,825, filed on Apr. 25, 2017.

(51) Int. Cl.
*H04L 12/931* (2013.01)
*H04W 52/18* (2009.01)

(52) U.S. Cl.
CPC .......... *H04L 49/405* (2013.01); *H04W 52/18* (2013.01)

(58) Field of Classification Search
CPC ............ H04W 74/08; H04W 74/0808; H04W 74/0816; H04W 74/0825; H04W 74/0833; H04W 74/0841; H04W 74/085; H04W 74/0858
See application file for complete search history.

(56) References Cited

U.S. PATENT DOCUMENTS

2017/0118000 A1   4/2017   Chu et al.
2019/0014557 A1*  1/2019   Morioka ............ H04W 52/146

* cited by examiner

*Primary Examiner* — Kevin Kim

(57) ABSTRACT

A communication system includes a first basic service set (BSS) having a first plurality of nodes including a first node, and a second BSS overlapping the first BSS and having a second plurality of nodes including a second node. Upon receipt, from the second node, of a signal specifying a transmission duration, the first node operates at a reduced power level for a total time interval triggered by the signal. The total time interval may include a backoff duration of the first node, a transmit opportunity period (TXOP) of the first node, and a fixed grace period following the TXOP of the first node. A method of operating a node in such a system includes receiving, at the first node, a signal from the second node specifying a transmission duration, and operating the first node at a reduced power level for a total time interval triggered by the signal.

18 Claims, 5 Drawing Sheets

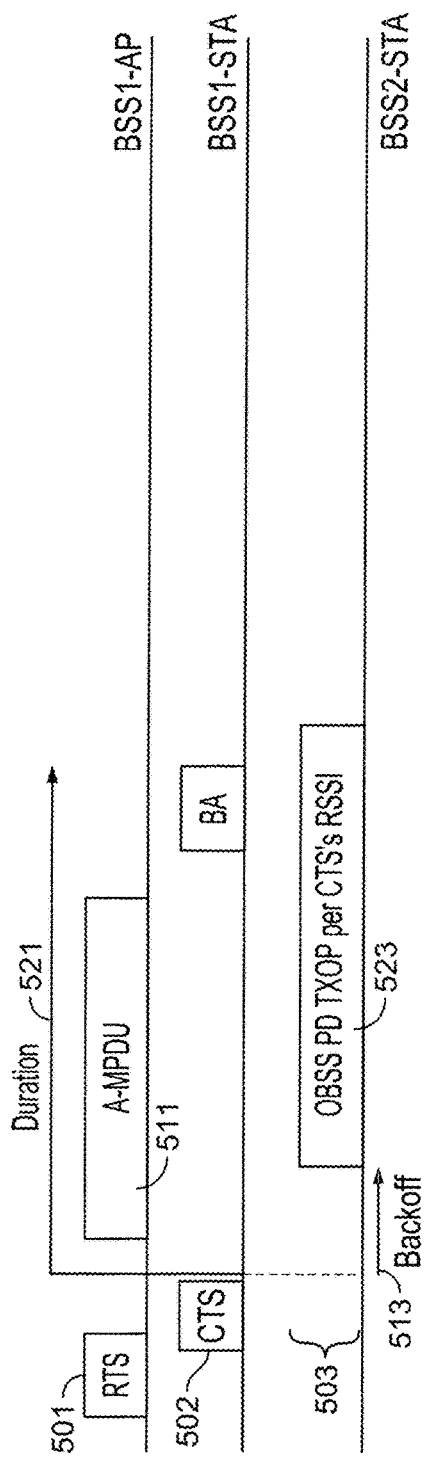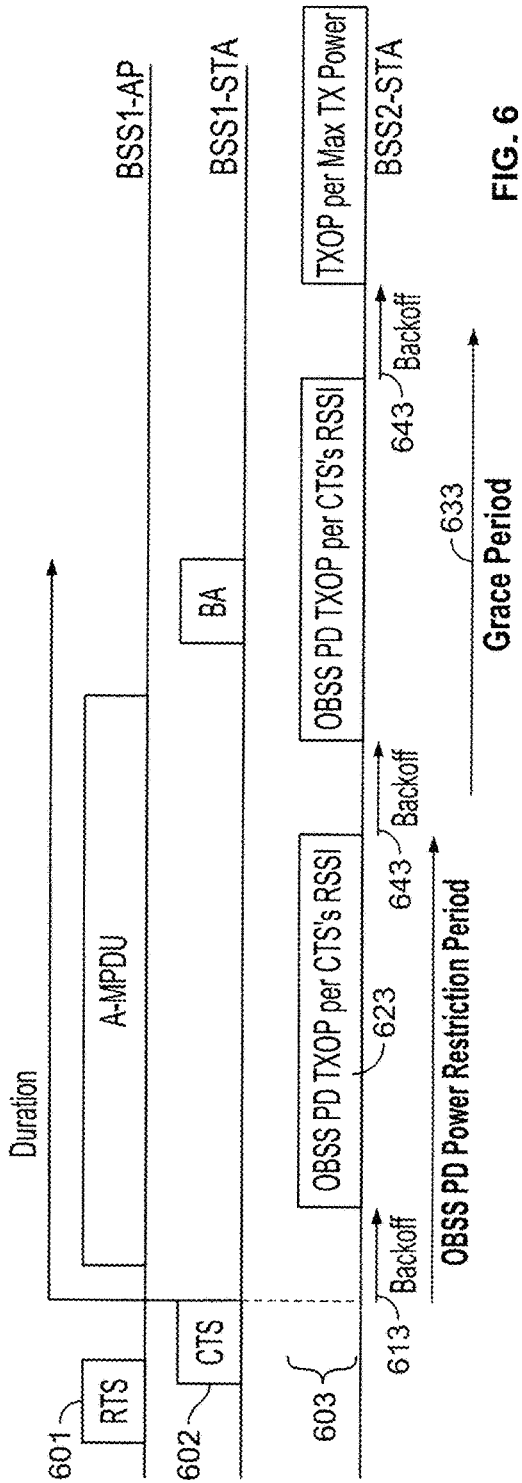

POWER RESTRICTION AND BACKOFF CONTROL FOR WIRELESS DEVICES

CROSS REFERENCE TO RELATED APPLICATION

This claims the benefit of commonly-assigned U.S. Provisional Patent Application No. 62/489,825, filed Apr. 25, 2017, which is hereby incorporated by reference herein in its entirety.

FIELD OF USE

This disclosure relates to power restriction and backoff control for avoiding collisions between overlapping basic service sets in a wireless network.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

In wireless systems, such as those operating under the IEEE 802.11 standard (including its different variants), an access point and the stations it serves make up a "basic service set" or BSS. When two nodes within a basic service set (e.g., two of the stations in the BSS) want to communicate, their signals include a duration field that specifies a transmit opportunity period (TXOP) during which other nodes within the basic service set should stay off the channel or operate at reduced power, to prevent collisions. For example, the stations may exchange a pair of signal frames called Ready-to-Send (RTS) and Clear-to-Send (CTS), which may include a field that specifies that. If another node detects activity on a channel and decides to share the medium with the detected activity, the node will remain idle for a duration known as a "backoff" period before trying again to use the medium, and after the backoff period, the node will operate at reduced power until the end of a "power restriction period" that is defined by the sum of the backoff period and one transmit opportunity (TXOP) period.

If a first node is in the same BSS as other nodes that have issued a signal that specifies a duration during which additional nodes should stay off the channel or operate at reduced power, then the first node must stay off the channel until the end of the duration. However, there may be multiple access points whose basic service sets overlap. In such an overlapping basic service sets (OBSS) situation, a first node that is in a different BSS than the other nodes may attempt to use a channel, detect that the channel is in use by the other nodes, and observe the backoff period and the power restriction period. However, because the first node belongs to a different BSS than the other nodes, the first node may not have retained the duration information broadcast by the other nodes. In such a case, after the power restriction period, if the channel is still in use by the other nodes, the first node will observe another backoff period and then resume full power operation, potentially causing a collision with the other nodes.

SUMMARY

A method of operating a node in a first basic service set that overlaps a second basic service set, according to a first implementation, includes receiving, at a first node in the first basic service set, a signal from a second node in the second basic service set, where the signal specifies a transmission duration, operating the first node at a reduced power level for a total time interval triggered by the signal.

In a method according to the first implementation, the total time interval may include a backoff duration of the first node, a transmit opportunity period of the first node, and a fixed grace period following the transmit opportunity period of the first node. In such a method, the fixed grace period may have a grace period duration at least equal to a maximal default transmit opportunity limit. The fixed grace period may have a grace period duration of 6 milliseconds (ms). Alternatively, the fixed grace period may have a grace period duration of 10 milliseconds (ms).

In a method according to the first implementation, the total time interval may have a total time interval duration that is determined based on the transmission duration specified in the signal. In such a method, the total time interval duration is equal to a longer one of (a) the transmission duration specified in the signal, and (b) a sum of the backoff duration of the first node and the transmit opportunity period of the first node.

A communication system according to a second implementation includes a first basic service set having a first plurality of nodes including a first node, and a second basic service set having a second plurality of nodes including a second node. The first basic service set overlaps the second basic service set. The first node in the first basic service set is configured to operate, upon receipt, from the second node in the second basic service set, of a signal specifying a transmission duration, at a reduced power level for a total time interval triggered by the signal.

In a communication system according to the second implementation, each respective node in the first plurality of nodes and the second plurality of nodes may include a respective controller, a respective backoff timer coupled to the controller for counting down a backoff duration of the respective node, and a respective transmit opportunity period timer coupled to the controller for counting down a transmit opportunity period of the respective node.

In such a communication system, each respective node in the first plurality of nodes and the second plurality of nodes may further includes a respective power restriction duration counter coupled to the controller for counting down a power restriction duration of the respective node. In addition, the total time interval may include the backoff duration of the first node, the transmit opportunity period of the first node, and a fixed grace period following the transmit opportunity period of the first node, the power restriction duration counter of the first node may be configured to count down the fixed grace period.

In such a communication system, the power restriction duration counter of the first node may be configured to count down a fixed grace period having grace period duration at least equal to a maximal default transmit opportunity limit. For example, the power restriction duration counter of the first node may be configured to count down a fixed grace period having grace period duration of 6 milliseconds (ms). Alternatively, the power restriction duration counter of the first node may be configured to count down a fixed grace period having grace period duration of 10 milliseconds (ms).

In such a communication system, the total time interval may have a total time interval duration determined based on the transmission duration specified in the signal, and the power restriction duration counter of the first node may be configured to store and count down the total time interval duration. The controller of the first node may determine the total time interval duration as a longer one of (a) the transmission duration specified in the signal, and (b) a sum of the backoff duration of the first node and the transmit opportunity period of the first node.

A communications node according to a third implementation, for use in a communication system including a first basic service set having a first plurality of nodes including the communications node, and a second basic service set having a second plurality of nodes including a second node, wherein the first basic service set overlaps the second basic service set, includes a controller, a backoff timer coupled to the controller for counting down a backoff duration of the communications node, and a transmit opportunity period timer coupled to the controller for counting down a transmit opportunity period of the communications node. The communications node is configured to operate, upon receipt from the second node in the second basic service set, of a signal specifying a transmission duration, at a reduced power level for a total time interval triggered by the signal.

Such a communications node may further include a power restriction duration counter coupled to the controller for counting down a power restriction duration of the communications node. In that communications node, the total time interval may have a total time interval duration including the backoff duration of the communications node, the transmit opportunity period of the communications node, and a fixed grace period following the transmit opportunity period of the communications node, the power restriction duration counter of the communications node may be configured to count down the fixed grace period. In addition, the controller of the first node may determine duration of the total time interval as a longer one of (a) the transmission duration specified in the signal, and (b) a sum of the backoff duration of the first node and the transmit opportunity period of the first node.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which:

FIG. 5 is a timing diagram of a second case of the first implementation of the subject matter of this disclosure;

FIG. 6 is a timing diagram of a second implementation of the subject matter of this disclosure;

DETAILED DESCRIPTION

Figure 1:
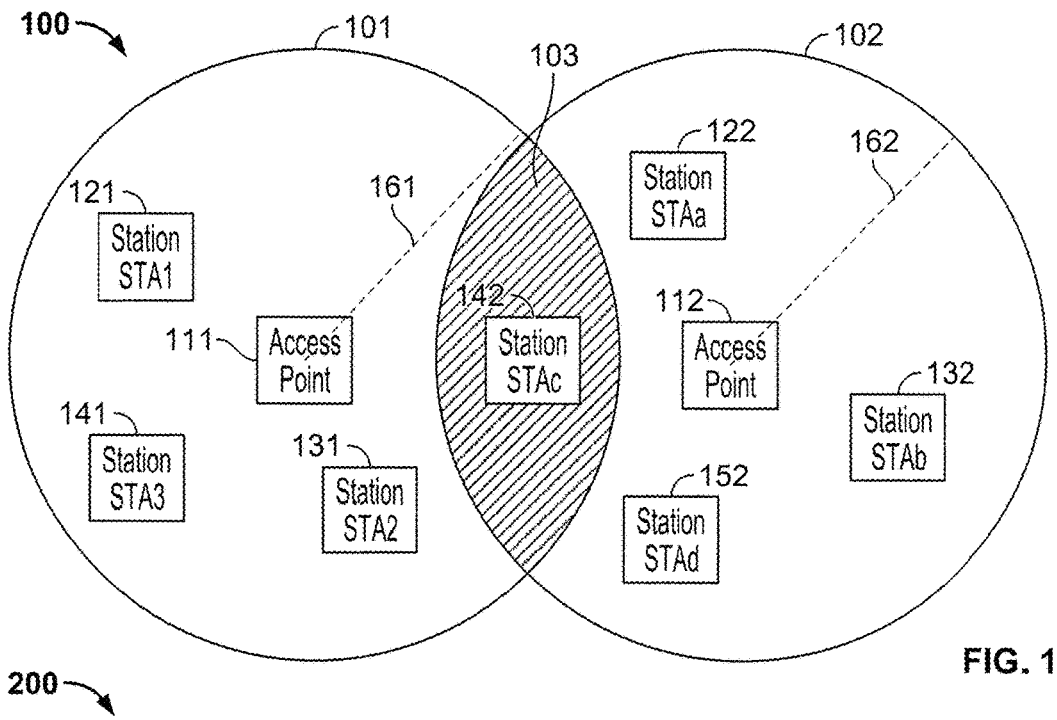
FIG. 1 shows an overlapping BSS environment in which the subject matter of this disclosure may be used.

As stated above, if a first node is in the same BSS as another node that has issued a signal that specifies a duration during which other nodes should stay off the channel or operate at reduced power (e.g., between −72 dBm and −82 dBm, instead of above −72 dBm), then the first node will know to stay off the channel until the end of the duration. However, there may be multiple access points whose basic service sets overlap.

In such an overlapping basic service sets (OBSS) situation, a first node in a different BSS than a second node may attempt to use a channel, detect that the channel is in use by the second node, and observe the backoff period and the power restriction period, but, because the first node belongs to a different BSS than the second node, according to previously-known protocols the first node will not have retained the duration information from the signal sent out by the second node. In such a case, after the power restriction period, if the channel is still in use by the other node, the first node will detect that use and observe another backoff period but then resume full power operation, potentially causing a collision with the second node in the other BSS.

In accordance with implementations of the subject matter of this disclosure, collisions are reduced by configuring a node in any BSS to operate in low-power mode (e.g., between −72 dBm and −82 dBm, rather than above −72 dBm) following detection of any activity on a channel, when that activity is by a node that belongs to a different BSS.

According to a first implementation, a first node which detects activity, by a second node from a different BSS, on a channel that the first node attempts to access, will enter a backoff period and, at the end of the backoff period, the first node will operate at low power for at least one transmit opportunity period, and longer if the first node had detected a signal from the second node indicating a duration during which the second node planned to transmit. The duration information will be retained even if the power level of the received signal frame is less than the Clear Channel Assessment power level (typically, −72 dBm), as long as the power level is above a minimum level (such as −82 dBm).

According to a second implementation, if a first node detects activity, by a second node from a different BSS, on a channel that the first node attempts to access, a grace period is added after each TXOP period that follows a first backoff period, because the second node might still be using the channel. Additional backoff periods (see 643 in FIG. 6) during the grace period (based on continued detection of activity on the channel) do not extend the grace period or start a new grace period. The grace period is sized so that the sum of one backoff period, one TXOP period, and the grace period will exceed the maximal default TXOP limit, so that normally any possible transmission will be completed before the grace period expires.

For example, the maximal default TXOP limit is normally 6 milliseconds (ms), so the grace period can be set to 6 ms, or to some other fixed value longer than 6 ms, such as 10 ms. If some fixed value other than 6 ms is used, it should not be so much longer than 6 ms as to unduly interfere with system operation. Therefore, 10 ms may be a practical upper limit in most cases.

The second implementation results in a fixed maximal power restriction period regardless of actual conditions. In contrast, the first implementation results in a power restriction period of varying length. Thus, there is a trade-off between the two implementations.

On the one hand, the second implementation may result in a power restriction period that is longer than necessary. On the other hand, in the first implementation, power is restricted only for a period during which a restriction is required.

However, the second implementation does not require changing the operation of the backoff timer in any node, while the first implementation may require changing the operation of the backoff timer in a node.

Specifically, in known configurations, if a power restriction duration is stored at a node based on receipt of a signal at that node from another node in the same BSS (i.e., an "intra-BSS" or "iBSS" signal), the backoff timer may be disabled. That is, to prevent the node from resuming transmission too soon—i.e., at the end of the sum of the backoff period and the TXOP—the node in a known configuration would not even be able to begin the backoff countdown until the low-power duration specified in the signal has expired. However, in such known configurations, the power restriction duration information from a signal that is received from a node in a different BSS (i.e., an "OBSS" signal) is not even retained, let alone followed, by the receiving node.

Therefore, according to the first implementation of the subject matter of this disclosure, the behavior of the node is changed relative to the known behavior, not only by retaining the power restriction duration value, but also allowing the backoff timer to operate even if a power restriction duration has been stored. Therefore, operation subsequent to the backoff period will remain at a lower power level until the power restriction duration period expires (subject to backoff after each TXOP during the power restriction duration).

FIG. 1 shows an overlapping BSS environment 100 in which the subject matter of this disclosure may be used. BSS 101 includes access point 111 and stations STAT 121, STA2 131 and STA3 141. BSS 102 includes access point 112 and stations STAa 122, STAb 132, STAc 142 and STAd 152. The compositions of both BSS 101 and BSS 102 may change dynamically as stations move in and out of range of access points 111, 112. The ranges of access points 111, 112 overlap, as indicated by radii 161, 162. Any station within shaded overlap area 103 can communicate with both access points 111, 112 but, in accordance with the applicable protocols, can only belong to one of BSSs 101 and 102. In the example shown in FIG. 1, only STAc 142, which belongs to BSS 102, is located in the overlap area 103. Moreover, STAc 142 lies within range, not only of both access points 111, 112, but also of STAa 122 and STAd 152 of BSS 102, and STA2 131 of BSS 101.

Figure 2:
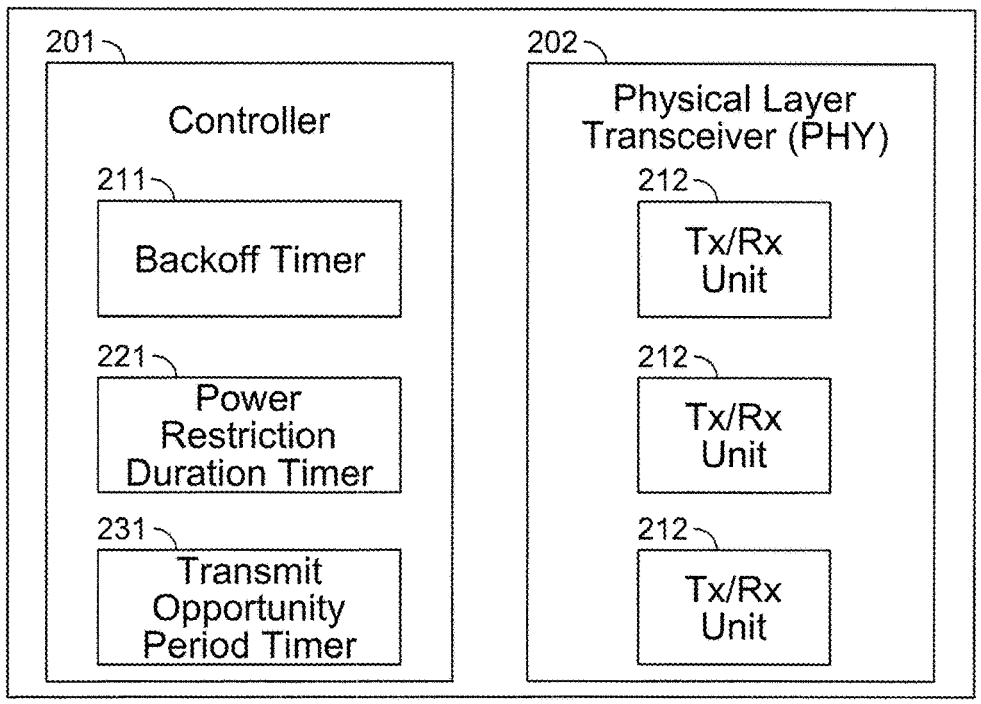
FIG. 2 is a block diagram of the structure of a node in the environment of FIG. 1.

Each one of access points 111, 112 and stations STAT 121, STA2 131, STA3 141, STAa 122, STAb 132, STAc 142 and STAd 152 may have a structure such as structure 200 of FIG. 2. Structure 200 includes at least a controller 201 (which may be a microprocessor or microcontroller loaded with suitable programming or microcode, or may be circuitry hard-wired to perform the necessary control functions of structure 200) and a physical layer transceiver (PHY) 202 containing one or more transceiver units (Tx/Rx) 212. Controller 201 may include a backoff timer 211 programmed to countdown a backoff duration as described above and as further described below, and a power restriction duration timer 221 which can be loaded with a duration value (based on a received signal) which it then counts down during a power restriction period as described above and as further described below. Controller 201 also may include a transmit opportunity period timer 231 programmed to countdown a transmit opportunity period. Other components, such as, e.g., antennas, may differ depending on whether node 200 is an access point or a station, and are not shown.

For intra-BSS situations in known implementations, if a first node (i.e., an access point or a station) receives a signal, such as a CTS signal, sent by another node in the same BSS, the first node will stay off the channel for the duration value (known as a network allocation vector timer, or NAV timer) specified in the CTS signal. Under known OBSS phase-detect spatial reuse (OBSS_PD SR) rules, if a first node (i.e., an access point or a station) receives a signal sent by another node in a different BSS and the received signal is lower than the OBSS_PD clear channel assessment (CCA) level (−82 dbm), the first node will stay off the channel for the backoff timer duration, and will then access the channel for one TXOP period at a reduced power level. After that TXOP period, the first node will again attempt to access the channel and, if the channel is still in use, will again stay off the channel while its backoff timer counts down again, and then will access the channel at full power, possibly causing conflicts with the other node in the other BSS.

Figure 3:
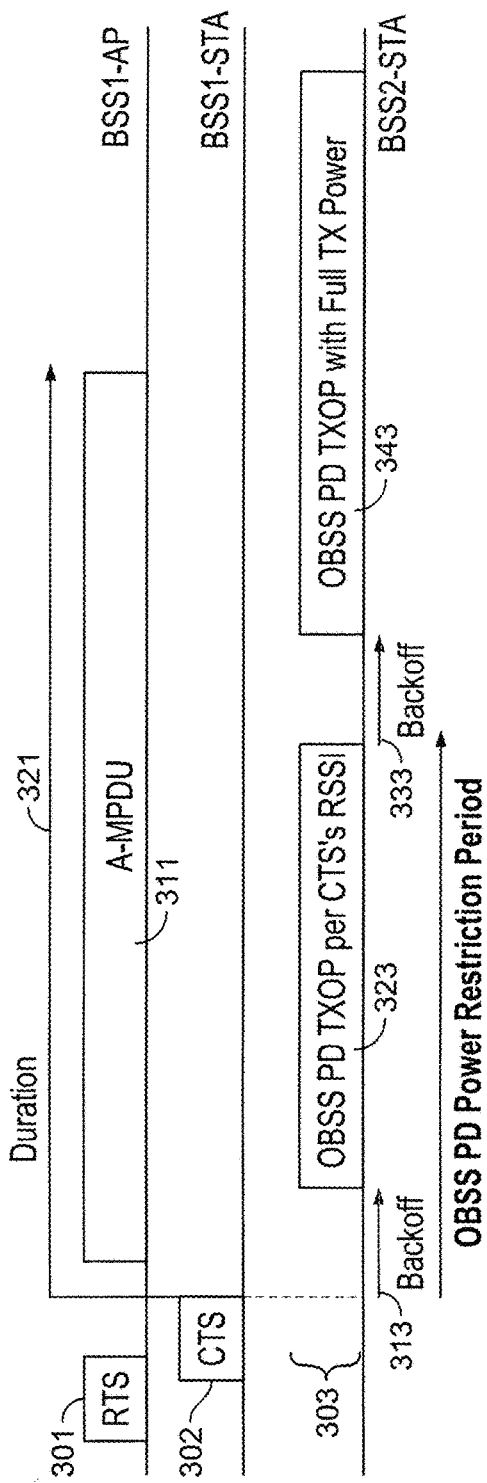
FIG. 3 is a timing diagram showing a potential for collision according to known implementations.

The problem is illustrated in FIG. 3, which shows an RTS signal 301 and a CTS signal 302 exchanged by two nodes (e.g., an AP and a station) in a first BSS, after which the node that sent RTS signal 301 sends an aggregated Media Access Control protocol data unit 311 (also known as an aggregated MAC protocol data unit, or A-MPDU). A-MPDU 311 has a duration 321 which is specified in the RTS/CTS signal exchange. The second node in the first BSS knows, from receiving the duration signal, not to transmit during that duration.

However, in known implementations, any node in a different BSS that is in range of the transmissions of the aforementioned nodes in the first BSS and determines that the received signal strength indication (RSSI) of the received frame is lower than the selected OBSS PD CCA level, will not retain the duration information from the RTS/CTS signals (or other signal that includes such information), although it will retain a maximum permitted transmission power (maximum permitted RSSI). The signaling behavior of such an OBSS node is illustrated at 303. The OBSS node will wait for its backoff duration 313, then transmit at the reduced RSSI indicated in CTS signal 302 for one TXOP period 323. After expiration of the backoff period 313 and one TXOP period 323, the power restriction period for the OBSS node will be over. If the OBSS node needs to transmit, the OBSS node will sense the channel, but because the OBSS node is sensing the medium in the middle of a PLCP protocol data unit (PPDU) carrying A-MPDU 311, the OBSS node will not detect the activity. Therefore, the OBSS node will wait for a second backoff period 333, and then begin transmitting during the next TXOP period 343 at full power. In this example, a collision may result between the full power OBSS node transmission 343 and A-MPDU 311 of the first BSS.

According to a first implementation of the subject matter of this disclosure, a node that receives a signal from another node in a different BSS (i.e., in an OBSS situation), will not discard the remaining-TXOP duration data from that signal. The OBSS node will maintain a power restriction until the later of (a) the remaining-TXOP duration data from the received signal, and (b) the end of the first TXOP period following the first backoff period. These cases are illustrated in FIGS. 4 and 5.

Figure 4:
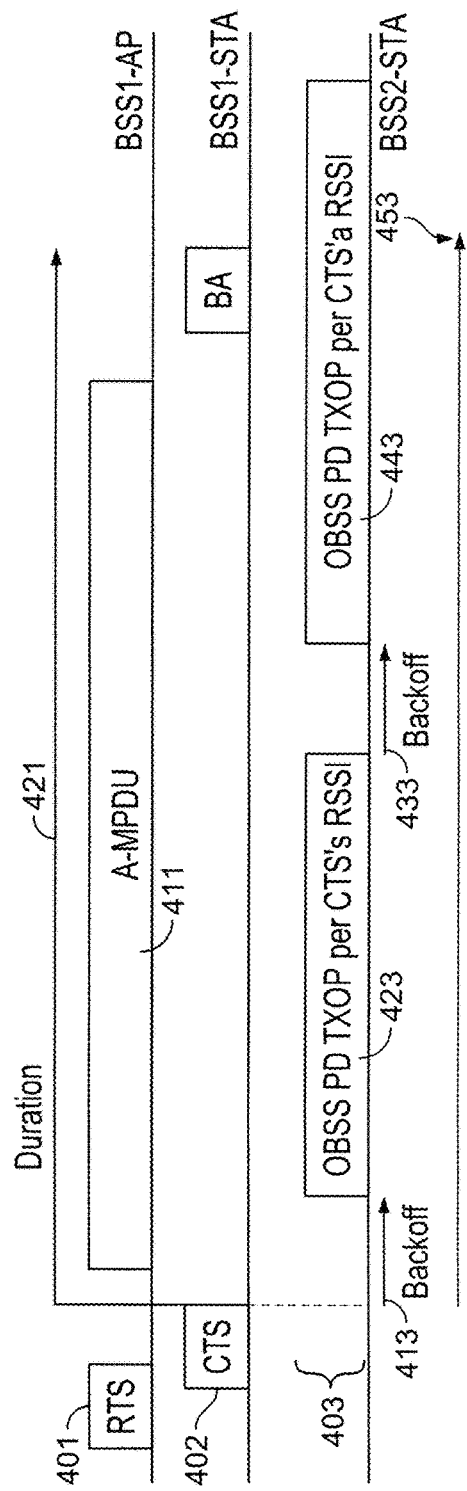
FIG. 4 is a timing diagram of a first case of a first implementation of the subject matter of this disclosure.

FIG. 4 shows the case where the OBSS node uses the remaining-TXOP duration data. In this example, an RTS signal 401 and a CTS signal 402 are exchanged by two nodes in a first BSS, after which the node that sent RTS signal 401 sends A-MPDU 411. A-MPDU 411 has a duration 421 which is specified in the RTS/CTS signal exchange. In this case, that duration is longer than the sum of the backoff duration 413 and the TXOP period 423 of the OBSS node that also receives the signals from the first BSS (see OBSS behavior 403). The OBSS node will wait for its backoff duration 413, then transmit at the reduced transmission power indicated by the RSSI of the detected CTS signal 402 for one TXOP period 423. After expiration of the backoff period 413 and one TXOP period 423, the power restriction period for the OBSS node will not be over. If the OBSS node needs to transmit, the OBSS node will sense the channel and, although the OBSS node does not detect activity (the OBSS node will not detect an ongoing A-MPDU because it is using energy detection to detect activity; see below), the OBSS node will wait for a second backoff period 433, and then begin transmitting during the next TXOP period 443, still using the reduced transmission power indicated by the RSSI ted in CTS signal 402, because the power restriction period timer set according to the CTS signal still has non-zero value. In this example, the power restriction period set by the remaining-TXOP duration data will expire at 453, before the end of TXOP period 443, but the transmit power will not be increased during TXOP period 443.

FIG. 5 shows the case where the remaining-TXOP duration in the CTS frame is shorter than the sum of the backoff timer duration and one TXOP period of the OBSS node. An RTS signal 501 and a CTS signal 502 are exchanged by two nodes in a first BSS, after which the node that sent RTS signal 501 sends A-MPDU 511. A-MPDU 511 and the following Block Acknowledgment (BA) have a combined duration 521 which is specified in the RTS/CTS signal exchange. In this case, that duration is shorter than the sum of the backoff duration 513 and the TXOP period 523 of the OBSS node that also receives the signals from the first BSS (see OBSS behavior 503). The OBSS node will wait for its backoff duration 513, then transmit at the reduced RSSI indicated in CTS signal 502 for one TXOP period 523. After expiration of the backoff period 513 and one TXOP period 523, the power restriction period for the OBSS node will be over.

As noted above, in known systems, after an OBSS_PD power-restricted period where the reduced power, set according to the RSSI or OBSS_PD CCA level, is used to transmit frames, a node can resume normal transmission power after backoff. This may create more collisions. Thus, in accordance with the subject matter of this disclosure, the system is configured so that if the power restriction period timer, which is set per the remaining TXOP time carried in the OBSS frame, is not zero after the backoff, the node cannot resume normal transmission power.

According to a second implementation of the subject matter of this disclosure, illustrated in FIG. 6, a node that receives a CTS signal 602 from another node in a different BSS (i.e., in an OBSS situation), will maintain a power restriction for the sum of one backoff period 613, one TXOP period 623, and a grace period 633 (see OBSS behavior 603).

As discussed above, grace period 633 is sized so that the A-MPDU and its corresponding BA will be finished before the end of the grace period. Therefore, the OBSS node can resume transmission by using the maximal transmission power per CCA level (−82 dbm).

As noted above, the maximal default TXOP limit is normally 6 ms, so the grace period can be set to 6 ms, or to some other fixed value longer than 6 ms, such as 10 ms. If some fixed value other than 6 ms is used, it should not be so much longer than 6 ms as to unduly interfere with system operation. Therefore, 10 ms may be a practical upper limit in most cases.

As also noted above, this second implementation results in a fixed maximal power restriction period regardless of actual conditions. In contrast, the first implementation results in a power restriction period of varying length, to better match the actual conditions. This difference in behavior is balanced by the trade-off discussed above, in the first implementation is more complex but better matches conditions, while the second implementation is less complex but does not attempt to match conditions.

The changes relative to known systems that are made according this disclosure as discussed above apply only to a specific RSSI band between the minimal CCA level (−82 dBm) and OBSS_PD the CCA level, which may be −72 dBm or −74 dBm. An illustration is shown in the following table, in which the OBSS_PD CCA level is −72 dBm (although as just noted, the OBSS_PD CCA level can have other values, such as −74 dBm):

| Power level | iBSS | | OBSS | |
| --- | --- | --- | --- | --- |
| | Known Systems | Current System | Known Systems | Current System |
| $P \geq -62$ dBm | Duration retained | Same | Duration retained based on energy level | Same |
| $-72$ dBm $< P < -62$ dBm | Duration retained | Same | Duration retained (for backoff procedure) | Same |
| $-82$ dBm $\leq P \leq -72$ dBm | Duration retained | Same | Duration discarded | Duration retained or grace period used |
| $P < -82$ dBm | Duration retained | Same | Duration discarded | Same |

As seen in the table, for intra-BSS signaling, there is no change in behavior at any RSSI level—i.e., the NAV timer duration value is always retained. Even for OBSS signaling, there is no change in behavior at most RSSI levels. Only in the RSSI band at or above −82 dBm up to and including the OBSS_PD CCA power level is there a change in behavior. In that power level band, rather than discarding the remaining-TXOP duration data as in known systems, in systems according to the current disclosure, either the remaining-TXOP duration data is retained and used, or the aforementioned grace period is used as a coarse approximation of the duration.

Figure 7:
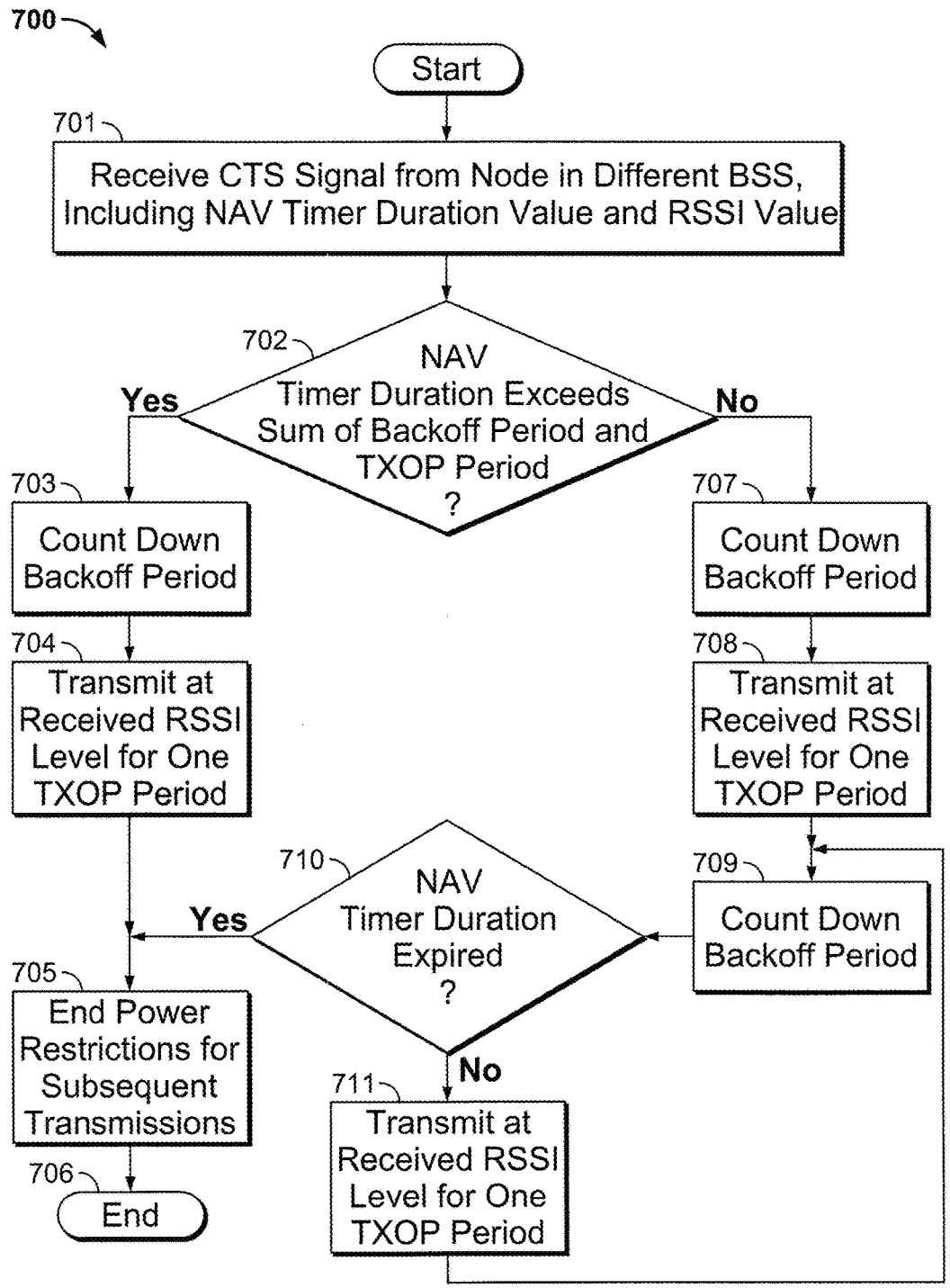
FIG. 7 is a flow diagram of a method according to the first implementation of the subject matter of this disclosure.

A flow diagram of a method 700 according to the first implementation of the subject matter of this disclosure is shown in FIG. 7. Method 700 begins at 701, where a first node (such as node 142) in a first BSS (such as BSS 102) receives a signal—e.g., a CTS signal—from a second node in a different BSS (such as BSS 101). The CTS signal includes a remaining-TXOP duration value and an RSSI value. At 702, the remaining-TXOP duration value is compared to the sum of the first node's backoff period and TXOP period. If the remaining-TXOP duration value exceeds the sum of the first node's backoff period and TXOP period, then the first node counts down the backoff period at 703, transmits at the RSSI level received in the CTS signal for one TXOP period at 704, and ends power restrictions for subsequent transmissions at 705. Method 700 then ends at 706.

If at 702, the remaining-TXOP duration does not exceed the sum of the first node's backoff period and TXOP period, then the first node counts down the backoff period at 707, transmits at the RSSI level received in the CTS signal for one TXOP period at 708, and again counts down the backoff period at 709. At 710, it is determined whether the NAV timer duration has expired. If so, power restrictions for subsequent transmissions are ended at 705, and method 700 ends at 706. If at 710, it is determined that the NAV timer duration has not expired, then at 711, the first node transmits at the RSSI level received in the CTS signal for one TXOP period, and flow returns to 709.

Figure 8:
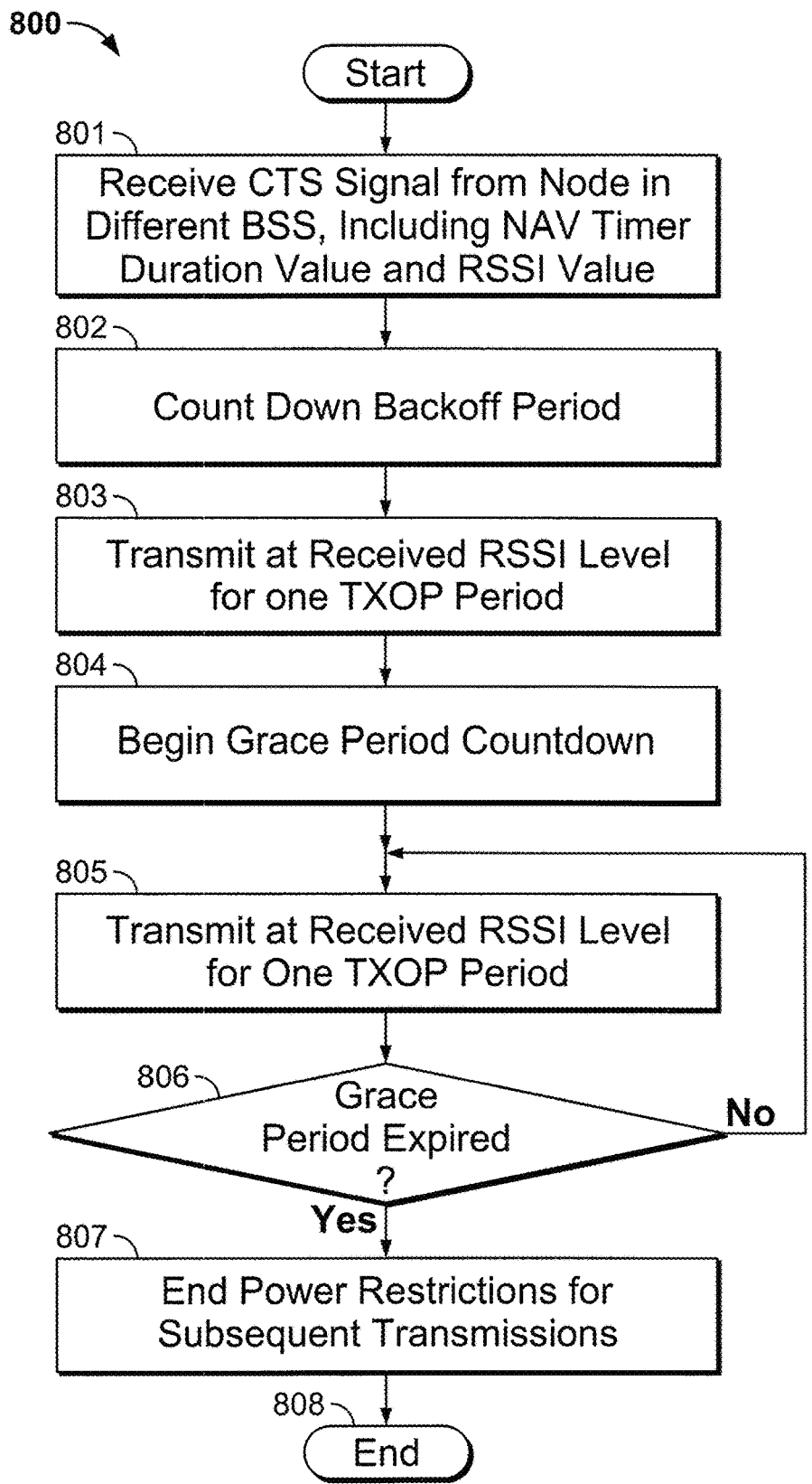
FIG. 8 is a flow diagram of a method according to the second implementation of the subject matter of this disclosure.

A flow diagram of a method 800 according to the second implementation of the subject matter of this disclosure is shown in FIG. 8. Method 800 begins at 801, where a first node (such as node 142) in a first BSS (such as BSS 102) receives a CTS signal from a second node in a different BSS (such as BSS 101). The CTS signal includes a NAV timer duration value and an RSSI value. The first node counts down a backoff period at 802, transmits at the received RSSI level for one TXOP period at 803, and begins a grace period countdown at 804 (the power restriction duration timer 221 can be used for this purpose, insofar as it is not being used as a NAV timer in this implementation).

The first node transmits at the received RSSI level for one TXOP period at 805, then determines at 806 whether the grace period has expired. If so, then at 807 power restrictions for subsequent transmissions are ended, and method 800 ends at 808. If at 806 it is determined that the grace period has not expired, then flow returns to 805.

Thus it is seen that a method of operating nodes in overlapping basic service sets to minimize or prevent interference, as well as corresponding apparatus, have been provided.

Throughout this disclosure, references are made to counters and/or timers "counting down" from a predefined time. As used herein, "counting down" refers to all implementations of a timer expiring after a predefined time. By way of example, a timer counting down can refer to an implementation in which the timer is preloaded with the predefined time, and counts down from the predefined time to zero. Alternatively, a timer counting down can also refer to an implementation in which the timer starts at zero and counts up to the predefined time.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of operating a node in a first basic service set that overlaps a second basic service set, the method comprising:
   receiving, at a first node in the first basic service set, a signal from a second node in the second basic service set, the signal specifying a transmission duration; and
   operating the first node at a reduced power level for a total time interval triggered by the signal, the total time interval including a backoff duration of the first node, a transmit opportunity period of the first node, and a fixed grace period following the transmit opportunity period of the first node.

2. The method of claim 1 wherein the fixed grace period has a grace period duration at least equal to a maximal default transmit opportunity limit.

3. The method of claim 2 wherein the fixed grace period has a grace period duration of 6 milliseconds (ms).

4. The method of claim 2 wherein the fixed grace period has a grace period duration of 10 milliseconds (ms).

5. The method of claim 1 wherein the total time interval has a total time interval duration that is determined based on the transmission duration specified in the signal.

6. The method of claim 5 wherein the total time interval duration is equal to a longer one of (a) the transmission duration specified in the signal, and (b) a sum of the backoff duration of the first node and the transmit opportunity period of the first node.

7. A communication system comprising:
   a first basic service set having a first plurality of nodes, including a first node; and
   a second basic service set having a second plurality of nodes, including a second node; wherein:
   each respective node in the first plurality of nodes and the second plurality of nodes includes:
   a respective controller,
   a respective backoff timer coupled to the controller for counting down a backoff duration of the respective node, and
   a respective transmit opportunity period timer coupled to the controller for counting down a transmit opportunity period of the respective node;
   the first basic service set overlaps the second basic service set;
   the first node in the first basic service set is configured to operate, upon receipt, from the second node in the second basic service set, of a signal specifying a transmission duration, at a reduced power level for a total time interval triggered by the signal.

8. The communication system of claim 7 wherein each respective node in the first plurality of nodes and the second plurality of nodes further includes a respective power restriction duration counter coupled to the controller for counting down a power restriction duration of the respective node.

9. The communication system of claim 8 wherein:
   the total time interval includes the backoff duration of the first node, the transmit opportunity period of the first node, and a fixed grace period following the transmit opportunity period of the first node; and
   the power restriction duration counter of the first node is configured to count down the fixed grace period.

10. The communication system of claim 9 wherein the power restriction duration counter of the first node is configured to count down a fixed grace period having grace period duration at least equal to a maximal default transmit opportunity limit.

11. The communication system of claim 10 wherein the power restriction duration counter of the first node is configured to count down a fixed grace period having grace period duration of 6 milliseconds (ms).

12. The communication system of claim 10 wherein the power restriction duration counter of the first node is configured to count down a fixed grace period having grace period duration of 10 milliseconds (ms).

13. The communication system of claim 8 wherein:
   the total time interval has a total time interval duration determined based on the transmission duration specified in the signal; and
   the power restriction duration counter of the first node is configured to store and count down the total time interval duration.

14. The communication system of claim 13 wherein the controller of the first node determines the total time interval duration as a longer one of (a) the transmission duration specified in the signal, and (b) a sum of the backoff duration of the first node and the transmit opportunity period of the first node.

15. A communications node for use in a communication system including a first basic service set having a first plurality of nodes including the communications node, and a second basic service set having a second plurality of nodes including a second node, wherein the first basic service set overlaps the second basic service set, the communications node comprising:
    a controller;
    a backoff timer coupled to the controller for counting down a backoff duration of the communications node; and
    a transmit opportunity period timer coupled to the controller for counting down a transmit opportunity period of the communications node; wherein:
    the communications node is configured to operate, upon receipt from the second node in the second basic service set, of a signal specifying a transmission duration, at a reduced power level for a total time interval triggered by the signal.

16. The communications node of claim 15 further comprising a power restriction duration counter coupled to the controller for counting down a power restriction duration of the communications node.

17. The communications node of claim 16 wherein:
    the total time interval has a total time interval duration including the backoff duration of the communications node, the transmit opportunity period of the communications node, and a fixed grace period following the transmit opportunity period of the communications node; and
    the power restriction duration counter of the communications node is configured to count down the fixed grace period.

18. The communications node of claim 16 wherein the controller of the first node determines duration of the total time interval as a longer one of (a) the transmission duration specified in the signal, and (b) a sum of the backoff duration of the first node and the transmit opportunity period of the first node.

* * * * *